(12) United States Patent
Kelly et al.

(10) Patent No.: US 11,280,715 B2
(45) Date of Patent: Mar. 22, 2022

(54) PARTICLE SENSOR AND PARTICLE SENSING METHOD

(71) Applicant: KONINKLIJKE PHILIPS N.V., Eindhoven (NL)

(72) Inventors: Declan Patrick Kelly, Shanghai (CN); Shuang Chen, Shanghai (CN); Michael Martin Scheja, Shanghai (CN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 177 days.

(21) Appl. No.: 16/632,425

(22) PCT Filed: Jul. 25, 2018

(86) PCT No.: PCT/EP2018/070236
§ 371 (c)(1),
(2) Date: Jan. 20, 2020

(87) PCT Pub. No.: WO2019/020720
PCT Pub. Date: Jan. 31, 2019

(65) Prior Publication Data
US 2020/0209132 A1 Jul. 2, 2020

(30) Foreign Application Priority Data
Jul. 25, 2017 (CN) .................. PCT/CN2017/094205
Sep. 6, 2017 (EP) ..................... 17189554

(51) Int. Cl.
*G01N 15/06* (2006.01)
*G01N 1/22* (2006.01)
*G01N 15/14* (2006.01)

(52) U.S. Cl.
CPC .......... *G01N 15/06* (2013.01); *G01N 1/2273* (2013.01); *G01N 15/1459* (2013.01); *G01N 2015/0693* (2013.01)

(58) Field of Classification Search
CPC .. G01N 15/06; G01N 1/2273; G01N 15/1459; G01N 2015/0693; G01N 2001/2223; G01N 2015/1486
See application file for complete search history.

(56) References Cited

U.S. PATENT DOCUMENTS 6,972,424 B1    12/2005  Quist
2003/0159932 A1  8/2003  Betts
(Continued)

FOREIGN PATENT DOCUMENTS

| | | |
|---|---|---|
| EP | 2381238 | 10/2011 |
| JP | 2010145123 | 7/2010 |
| WO | 2012/032802 | 3/2012 |

OTHER PUBLICATIONS

International Search Report and Written Opinion dated Oct. 17, 2018 for International Application No. PCT/EP2018/070236 Filed Jul. 25, 2018.
(Continued)

*Primary Examiner* — Benjamin R Schmitt

(57) ABSTRACT

A particle sensing apparatus is provided for determining particle concentration in a fluid, e.g. air. The apparatus is based on fluid-flow passageway having an upstream inlet to receive the fluid and a downstream outlet to exhaust the fluid. It also includes a recirculation passageway in fluid communication with the fluid-flow passageway. Between them, the fluid-flow passageway and the recirculation passageway define a recirculation loop. A first particle sensor is located in the recirculation loop, and other sensors may also be present at other options. A force applicator is included in the fluid-flow passageway to apply a force to the particles entrained in the fluid. The force is used to direct some or all of the particles into the recirculation loop. This provides a choice between increasing the detection limit or the detection range. A processor determines the concentration of
(Continued)

particles in the fluid based on the concentration of particles detected at the first particle sensor.

14 Claims, 4 Drawing Sheets

(56) References Cited

U.S. PATENT DOCUMENTS

| | | | |
|---|---|---|---|
| 2007/0234780 A1* | 10/2007 | Gysling | G01F 1/666 |
| | | | 73/19.03 |
| 2009/0325269 A1 | 12/2009 | Marschke | |
| 2017/0010202 A1 | 1/2017 | Mizuno | |
| 2017/0122326 A1 | 5/2017 | Dahlquist | |

OTHER PUBLICATIONS

Wikipedia, "Photophoresis", last updated Jul. 2019 https://en.wikipedia.org/wiki/Photophoresis.

Wurm, et al: "Experiments on the Photophoretic Motion of Chondrules and Dust Aggregates—Indications for the Transport of Matter in Protoplanetary Disks", vol. 208, Issue 1, Jul. 2010, pp. 482-491 https://arxiv.org/ftp/arxiv/papers/1003/1003.2924.pdf.

Wikipedia, "Optical tweezers", last updated Dec. 2019 https://en.wikipedia.org/wiki/Optical_tweezers.

Ashkin, et al: "Optical trapping and manipulation of viruses and bacteria", Science Mar. 20, 1987, vol. 235, Issue 4795, pp. 1517-1520, Abstract.

Ding, et al: "On-chip manipulation of single microparticles, cells, and organisms using surface acoustic waves", PNAS Jul. 10, 2012 109 (28) 11105-11109 http://www.pnas.org/content/109/28/11105.long.

Geelhoed, et al: "Thermophoretic Particle Separation in Microfluidics" 2006 Institution of Chemical Engineers www.icheme.org/cherd Trans IChemE, Part A, May 2006 https://www.researchgate.net/publication/267971351_Thermophoretic_Particle_Separation.

Wikipedia, "Dielectrophoresis", last updated Sep. 2019 https://en.wikipedia.org/wiki/Dielectrophoresis.

Wikipedia, "Acoustic tweezers", last updated Oct. 2019 https://en.wikipedia.org/wiki/Acoustic_tweezers.

Thermophoresis, W. C. Hinds, Aerosol Technology, 2nd Edition, Wiley Interscience http://aerosol.ees.ufl.edu/Thermophoresis/section01.html.

* cited by examiner

PARTICLE SENSOR AND PARTICLE SENSING METHOD

CROSS REFERENCE TO RELATED APPLICATIONS

This application is the U.S. National Phase application under 35 U.S.C. § 371 of International Application No. PCT/EP2018/070236 filed Jul. 25, 2018, published as WO 2019/020720 on Jan. 31, 2019, which claims the benefit of European Patent Application Number 17189554.3 filed Sep. 6, 2017, and Application Number PCT/CN2017/094205 filed Jul. 25, 2017. These applications are hereby incorporated by reference herein.

FIELD OF THE INVENTION

This invention relates to sensors for detecting particles in a fluid flow and methods for detecting particles using such sensors.

BACKGROUND OF THE INVENTION

Air pollution is a worldwide concern, and a significant contributor to air pollution is particulate matter suspended in the air.

Particle pollution comes both from natural sources (such as volcanoes, dust storms, forest and grassland fires, living vegetation and sea spray) and from human activities (such as burning of fuels, transportation, power plants and various industrial processes). Besides these primary sources of particles, there are also secondary sources, which are fine particles generated through complicated atmospheric chemistry reactions of gas pollutants. Secondary sources include inorganic fine particles (e.g. sulfates, nitrates and ammonium salts generated by $SO_2$, $NO_2$, $NH_3$) and organic fine particles (generated by oxidation of volatile organic gases).

Particle pollution is especially acute in countries where the speed of industrialization stretches the boundaries of regulatory requirements relating to air quality (e.g. China).

Official outdoor air quality standards define particle matter concentration as mass concentration per unit volume (e.g. $\mu g/m^3$). A particular concern is pollution with particles having a diameter less than 2.5 μm (termed "PM2.5") as they are able to penetrate into the gas exchange regions of the lung (alveoli), and very small particles (<100 nm) may pass through the lungs to affect other organs.

The current Chinese standard for PM 2.5 limits is 75 $\mu g/m^3$. The WHO standard is 10 $\mu g/m^3$ for the annual mean and 25 $\mu g/m^3$ for the 24-hour mean. Therefore, an accurate way to detect particle concentrations especially at low concentration is essential to judge pollution hazard level and corresponding health effect.

Moreover, as a consequence of increasing consumer empowerment, the demand for information about the air quality of living spaces is increasing. Availability of air-quality data as well as national and international media attention has created strong consumer awareness about the problem.

Bio-particulates, such as pollen, bacteria and viruses, are also an issue for air quality.

Low cost particle sensors are available to measure particle pollution. They are typically based on the measurement of light scattered at the particles which are entrained by an air flow through a detection volume. The light is generated by LEDs or lasers and creates a focused beam which is crossed by the particles to be sensed. The air flow is often induced by a fan for a forced air flow or a heater for a convection air flow. Optical particle sensors typically give a particle count as the sensor output, and this information is then converted to a mass concentration. Particle sensors are also being developed using self-mixing interferometry, by which scattered light from a detected particle enters the laser and causes a modulation of the laser power.

Particle sensors of these types, based on scattering from LEDs or lasers, take time at low concentrations to give a stable reading. However, certain types of particles in air are found at very low concentrations. For example, pollen levels are considered high when more than 40 particles/$m^3$ are present. Furthermore these optical sensors only detect particles in a certain volume of the air so that relatively low readings are obtained.

The time to reach a stable value means the user has to wait a long time before a stable and reliable reading is obtained.

An additional problem is that adaptions of the sensors to increase their detection limits for air samples with low concentrations of particles are not able to offer the necessary detection range when higher levels of particles are present in the air.

US 2003/0159932 discloses a sensor system for sensing a low concentration of particles. An actuator is used to implement a channel narrowing so that the particle concentration is increased. However, this introduces an additional flow restriction, which affects the general fluid flow through the sensor.

SUMMARY OF THE INVENTION

There is therefore still a need for a particle sensor which can detect low concentrations of particles in a practical timeframe.

The invention is defined by the claims.

According to a first aspect of the invention, there is provided a particle sensing apparatus for determining particle concentration in a fluid comprising:

a fluid-flow passageway having an upstream inlet to receive the fluid and a downstream outlet to exhaust the fluid;

a recirculation passageway in fluid communication with the fluid-flow passageway, where a portion of the fluid-flow passageway and the recirculation passageway define a recirculation loop;

a flow control arrangement for generating a flow of said fluid between the upstream inlet and the downstream outlet and around the recirculation loop;

a first particle sensor located in the recirculation loop;

a force applicator to apply a force to the particles entrained in the fluid such that the particles move relative to said flow, the force applicator being arranged to control the passage of the particles into the recirculation loop or to the downstream outlet; and a processor adapted to determine the concentration of particles in the fluid based on the concentration of particles detected at the first particle sensor.

In one set of examples, the force applicator is for applying a force to the particles to direct them towards the recirculation loop.

The apparatus then improves the detection limit by recirculating the particles over the sensor so that the sensor detects a greater number of particles. It does this by deflecting the particles into a recirculation loop by applying a force to the particles as they flow through the apparatus. The recirculation loop allows the particles to pass the sensor multiple times thereby providing a higher effective concentration.

In another set of examples, the force applicator is for applying a force to the particles to direct them towards the downstream outlet. In this way, the concentration of particles in the recirculation loop in particular can be reduced, so that high concentrations may be measured without saturating the particle sensor.

These two possibilities may be combined. For example, the force applicator may comprise a first force application unit for applying a force to the particles to direct them towards the recirculation loop and a second force application unit for applying a force to the particles to direct them towards the downstream outlet.

In this case, the apparatus may be used to extend the detection range, as well as the detection limit. To do this, the first particle sensor is located in the portion of the fluid-flow passageway, and the apparatus further comprises a second particle sensor located in the recirculation passageway. This allows some of the particles to be directed to the exhaust, so that the apparatus is also useable in the situation where the source fluid contains high concentrations of particles.

Note that the "control" provided by the application of force may be considered to be probabilistic rather than absolute, in that the force changes the probability that a given particle reaches the outlet of the recirculation passageway, and hence overall the fraction of particles which pass to the two possible paths.

The force applicator typically applies heat, electromagnetic radiation, electrical energy or sound. These are known approaches meaning that the apparatus of the invention can rely on readily available components. Such components are also low cost.

The force applicator may be adjustable to provide different levels of force to the particles. This allows for a greater degree of adaptability to ranges of particle concentrations.

The apparatus may further comprise an inlet particle sensor for detecting an inlet concentration of particles in the fluid, said inlet sensor being located in the fluid-flow passageway between the upstream inlet and said portion of the fluid-flow passageway. This allows for the apparatus to be controlled based on the incident concentration, for example to switch between focusing on detection range and detection limit based on an initial assessment of the concentration of the particles in the fluid.

The processor may be adapted to compare said inlet concentration to a predetermined upper concentration threshold and a predetermined lower concentration threshold, and control the force applicator to direct the particles towards the recirculation passageway if said inlet concentration is lower than or equal to the lower concentration threshold, or towards the outlet if said inlet concentration is higher than or equal to the upper concentration threshold.

The apparatus is preferably used to detect air pollution and so the fluid is preferably air.

In an embodiment, the first particle sensor and, when present, the second and third particle sensors, comprise an optical module for emitting light and a detector for detecting light scattered by the entrained particles. These are widely used in the art and, again, allows the apparatus to use readily available and low cost components.

The invention also provides a method for determining particle concentration in a fluid comprising the steps of:
providing the fluid to an inlet of a fluid-flow passageway;
generating a flow of said fluid between the inlet and an outlet of the fluid-flow passageway and around a recirculation loop which is defined by a portion of the fluid-flow passageway and a recirculation passageway;
applying a force to the particles entrained in the fluid such that the particles move relative to said flow, said force controlling the passage of the particles either into the recirculation passageway or to the outlet;
detecting a concentration of particles within the recirculation loop; and
determining the concentration of particles in the fluid based on the concentration of particles detected within the recirculation loop.

This method makes use of a recirculation loop to alter the concentration at a particle detector, so that sensitivity can be increased or saturation can be avoided.

Applying a force may comprise applying a force to the particles to direct them towards the recirculation passageway, and detecting a concentration of particles is within fluid-flow passageway, such that applying a force provides a higher detected concentration than in the fluid entering the apparatus.

By forcing particles to recirculate, the concentration is increased.

Applying a force may instead comprise applying a force to the particles to direct them towards the outlet, and detecting a concentration of particles is within the recirculation passageway of the recirculation loop, such that applying a force provides a lower detected concentration than in the fluid entering the apparatus.

By forcing particles to exhaust, the concentration is reduced in the recirculation path.

In an embodiment, the method comprises:
detecting an inlet concentration of particles at the inlet;
comparing said inlet concentration to a predetermined upper concentration threshold and a predetermined lower concentration threshold; and
if the inlet concentration is equal to or lower than said predetermined lower concentration threshold:
applying a force comprises applying a force to the particles to direct them towards the recirculation passageway, and detecting a concentration of particles within the fluid-flow passageway, such that applying a force provides a higher detected concentration than in the fluid entering the apparatus;
if the inlet concentration is equal to or higher than said predetermined upper concentration threshold:
applying a force comprises applying a force to the particles to direct them towards the outlet, and detecting a concentration of particles is within the recirculation passageway of the recirculation loop, such that applying a force provides a lower detected concentration than in the fluid entering the apparatus.

The predetermined lower concentration threshold may, for instance, be between 20 $\mu g/m^3$ and 100 $\mu g/m^3$.

The predetermined upper concentration threshold may, for instance, be about 400 $\mu g/m^3$, depending on the concentration at which the sensor is saturated.

The particles in the fluid may be PM 2.5 particles. These can be particularly problematic and hence it is important to be able to determine their quantity in air.

The particles are often one or more of inorganic particulates, organic particulates and bio-particulates. These are common particulate air pollutants.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a particle sensing apparatus for determining particle concentration in a fluid, such as air. The apparatus relies on known sensors to detect particles which are entrained in a fluid flow.

A particle sensing apparatus is provided for determining particle concentration in a fluid, e.g. air. The apparatus is based on fluid-flow passageway having an upstream inlet to receive the fluid and a downstream outlet to exhaust the fluid. It also includes a recirculation passageway in fluid communication with the fluid-flow passageway. Between them, a portion of the fluid-flow passageway and the recirculation passageway define a recirculation loop. The apparatus has a flow control arrangement for generating a flow of said fluid between the upstream inlet and the downstream outlet and around the recirculation loop. A first particle sensor is located in the recirculation loop, and other sensors may also be present at other positions. A force applicator is included in the fluid-flow passageway to apply a force to the particles entrained in the fluid such that the particles move relative to the flow of fluid. The force is used to direct some or all of the particles into the recirculation loop (with the remainder being directed to the downstream outlet). This provides a choice between increasing the detection limit or the detection range. A processor determines the concentration of particles in the fluid based on the concentration of particles detected at the first particle sensor.

Figure 1:
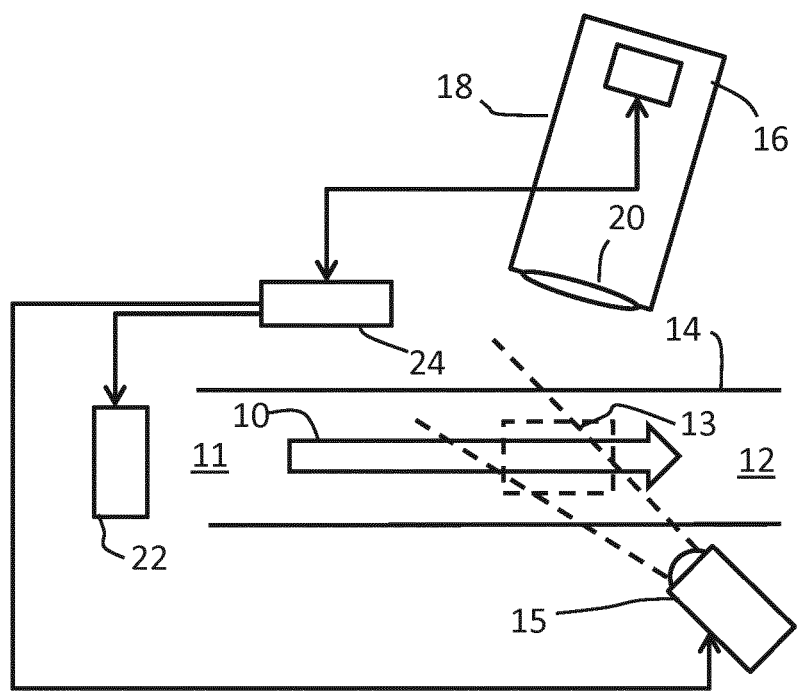
FIG. 1 shows a known particle sensing system.

FIG. 1 shows an example of a known optical sensor, upon which the invention is based. FIG. 1 shows a fluid flow 10 from an inlet 11 of a fluid-flow passageway 14 to an outlet 12 of the fluid-flow passageway 14. The passageway is defined by a conduit. The inside of the fluid-flow passageway has a detection volume 13.

An optical module (here an infrared LED, $\lambda$, =890 nm) 15 is used to illuminate the fluid to enable optical detection of entrained particles based on optical measurements of scattering. The optical module is to one side of the detection volume 13 and the sensing is carried out at the opposite side. An alternative design may make use of the reflection of light.

A particle sensor 16 is provided which here comprises a photodiode sensor 18 and a focusing lens 20 at which scattered light is collected.

A flow control device 22, shown schematically in FIG. 1, is used for inducing flow through the sensor device. It may comprise a fan, or a heater may instead be used to create a convective heat flow. In the case of a heater, the sensor is positioned approximately vertically rather than horizontally as represented in FIG. 1.

A processor/controller 24 controls the processing of the sensor signals and operation of the flow control device and light source.

The detection volume 13 is formed at transparent portions of the fluid-flow passageway 14, which allow the light to pass through the conduit. The passageway may be part of a housing which is placed on a printed circuit board with the electronics to convert the signal due to the particles into a count. Leakage of LED light directly towards the photodiode sensor, which would give a background signal, is minimized and electronic filtering of any DC signal may be used to create a pulsed particle signal. The LED 15 is not directed towards the particle sensor 16, but they are instead at an angle so that only scattered light rather than direct light reaches the sensor 16. A light trap (not shown) is for example provided opposite the LED 15 to prevent reflections reaching the sensor 16.

The sensor may be used to provide a particle count for particles of a particular size. For example, the pulsed particle signal is amplified and compared with a threshold voltage. Above a certain particle size, the pulse height is sufficient to pass the threshold. The threshold thus implements a band pass filtering function. The pulse is counted and the pulse length is measured, resulting in a low-pulse occupancy time (LPO %).

A sensor of this type may thus provide a simple particle count (i.e. a count of the number of detection peaks which exceed the threshold set) as well as a low pulse occupancy measure which enables particle size information to be obtained. The threshold is for example implemented as a threshold voltage applied to a comparator which controls the particle size sensitivity of the sensor system. By adjusting the threshold, particle size bins may be defined to enable particle size distribution information to be obtained.

The sensor thus basically comprises a fluid-flow passageway having an inlet and an outlet with a fluid flow between them, a light source and an optical detector for making optical scattering measurements within a detection volume along the passageway, where the detector signal is correlated with particle size. If an adjustable threshold is used, particle size information may be obtained.

Further details of the design and operation of optical particle sensors of this type will be well known to those skilled in the art.

When a low concentration of particles is to be sensed, a long time may be required for the sensor to provide a stable output.

The invention provides increased particle concentration by using a recirculation of the particles. The effect may be used permanently or it may be selectively used.

It should be understood that the term "increased particle concentration", or words to that effect, includes an increase from 0 (i.e. no particles in the detection volume 13) to 1 particle in the detection volume. Indeed, for detection of particles with only a small number of particles per $m^3$, it is most likely that there will be either 0 particles or 1 particle in the detection volume at any time. The increase also does not mean that more particles are present; rather, it means that the sensor is seeing the same particle(s) multiple times and so it is actually the effective concentration which has increased. It may be considered as a way of improving the probability that a given particle passes through the detection volume 13.

The sensor can be calibrated using fluids including known concentrations of particles, so a reading at the sensor following application of a particular level of force can be converted to a particular particle concentration. Alternatively, a concentration factor can also be calculated using computational fluid dynamics methods under the particular conditions.

Figure 2:
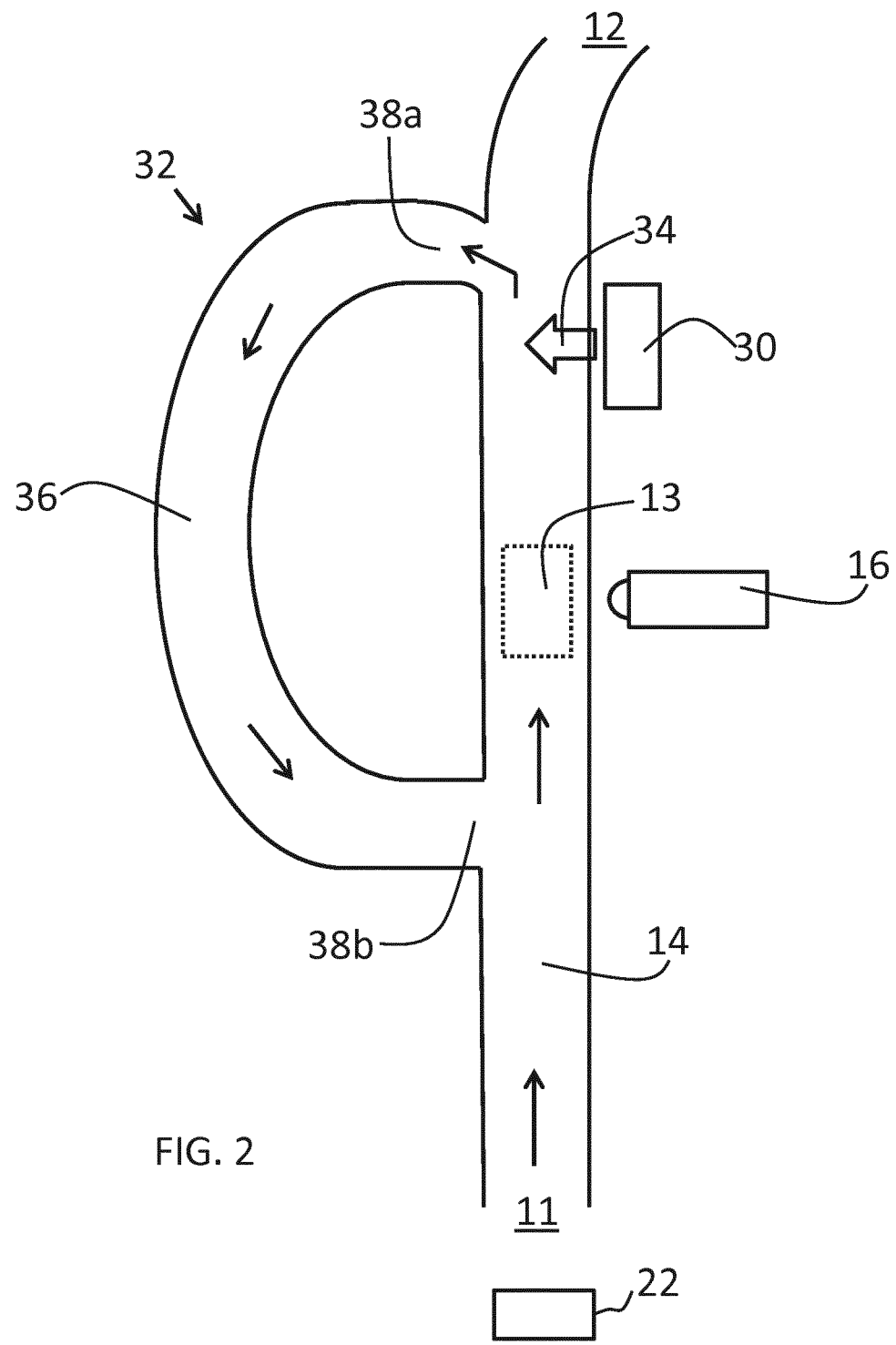
FIG. 2 shows a first example of a particle sensing apparatus of the invention, having a first particle sensor only.

FIG. 2 shows one embodiment of the apparatus of the invention. The same reference numbers are used as in FIG. 1 for the same components, and a description is not repeated.

The flow control arrangement may be implemented in any suitable manner. For example, the flow control arrangement may include a fan 22; the fluid-flow passageway and recirculation passageway being suitably arranged such that the air blown by the fan is circulated around the recirculation loop 32 and also is directed to the downstream outlet 12. The configuration of the various passageways in such an embodiment will be readily apparent to the skilled person. Alternatively or additionally, the flow control arrangement may include a plurality of fans, pump(s), heat source(s) etc. in order to attain the desired flow.

The apparatus has the fluid-flow passageway 14 having an upstream inlet 11 and downstream outlet 12. In contrast to FIG. 1, the apparatus of the invention employs a force applicator 30 and a recirculation loop 32 formed in part by a recirculation passageway 36. The force applied is shown as 34.

The force 34 diverts the particles into the recirculation passageway 36, while the fluid continues to flow to the outlet 12. The particles remain in the recirculation loop 32 for as long as the force 34 is applied.

As can be seen from FIG. 2, the recirculation loop 32 is formed of the recirculation passageway 36 and the part of fluid-flow passageway 14 between the downstream and upstream bifurcation points 38a, 38b. To be specific, the first bifurcation point 38a is the downstream port between the fluid-flow passageway and the recirculation passageway and the second bifurcation point 38b is the upstream port between the fluid-flow passageway and the recirculation passageway, where the direction of flow is defined by the fluid-flow passageway.

The apparatus has a first particle sensor 16 located in the recirculation loop. It may be in the fluid-flow passageway (i.e. the main branch between the inlet 11 and outlet 12) as shown but it may instead be in the recirculation passageway 36. The first particle sensor 16 detects the particles as they pass through the recirculation loop. When the force 34 is not applied, the first particle sensor 16 detects only the particles in the fluid as it enters the inlet. In this mode, the apparatus is not functionally different to that of the apparatus of FIG. 1. However, when the force 34 is applied, some or all of the particles are directed into the recirculation passageway 36. The number of particles directed into the recirculation passageway 36 depends on the amount of force applied. In one embodiment, substantially all of the particles are diverted into the recirculation passageway 36. This maximizes the signal at the first particle sensor 16. Any particles which are not diverted into the recirculation passageway 36 follow the fluid flow to the outlet 12.

The overall system may reach a state of equilibrium, when there is an equal rate of particles entering the system as leaving the system. The higher the proportion (averaged over time) of particles that are diverted around the recirculation passageway, the greater the effective multiplication of the concentration of particles at the detection volume 13. Alternatively, the recirculation may be started and stopped to provide a cyclic control. When the concentration reaches a level which saturates the sensor, the system may then stop the recirculation and the allow the particle concentration to drop again. In this case, the aim may be to divert all particles to the recirculation passageway when the diversion function is activated.

At any given particular time, the applied force may divert all particles into recirculation passageway. In particular, for low concentrations, a single particle may be received at a time, in which case that particle is either diverted or not diverted. Over time, a proportion of the particles will be diverted either as an overall steady state condition or as a result of slower cyclic control.

The force applicator 30 applies a pressure force to the particles entrained in the fluid, which directs some or all of the particles into the recirculation loop or to the downstream outlet. The force applicator 30 is located in a position to divert the particles towards the recirculation passageway 36. The proportion of particles directed into the recirculation passageway 36 is determined by the amount of force applied.

The whole process is under the control of a processor (not shown in FIG. 2). The processor analyses the signal received from the first particle sensor 16. The proportion of particles diverted into the recirculation loop is known from the amount of force applied. An analysis of the two allows a measure of the concentration of particles in the original fluid.

The proportion of particles diverted, for a given force, may be essentially constant. However, it may in practice vary as a function of the prevailing concentration. The analysis may of course take all effects into account.

The key is to apply a force on the fluid to push the particles into a recirculation loop so that the sensor senses the same particles multiple times thereby effectively concentrating the particles.

The known alternative of physically reducing the sensing volume/region size does not have the same effect because this reduces the overall fluid flow rate, because the overall flow resistance has increased. By using recirculation, the effective concentration is increased without reducing the overall flow rate.

The apparatus of FIG. 2 may be used in a method for determining particle concentration. In step (i), a fluid is provided to the inlet of the apparatus. In step (ii), a force is applied to recirculate some or all of the particles through the recirculation loop to provide a higher number of particles passing the first particle sensor than in the fluid entering the apparatus. In step (iii), the particles are measured at the first particle sensor. In step (iv), the concentration of the particles in the fluid is determined based on the concentration of the particles at the first particle sensor. As the concentration can be measured, and the proportion of particles entering the recirculation passageway is known based on the amount of force applied, a simple calculation provides the concentration in the original fluid.

The fluid used in the invention may be a gas or a liquid. A gas containing suspended particles is often termed an "aerosol" and a liquid containing suspended particles is often termed a "hydrocolloid". In a preferred embodiment, the fluid is a gas. The invention is particularly directed to air sensors and so the gas is preferably air.

Accordingly, the fluid-flow passageway 14 described herein is preferably an airflow passageway.

The fluid may be processed before entering the inlet 11, e.g. by carrying out a size-based pre-separation step. The apparatus may contain a pre-separator (not shown in the drawings) for this purpose. The pre-separator may be a filter.

The particles in the fluid may be PM1, PM2.5 or PM10 particles. Often PM 2.5 particles are detected. A preferred combination is where the fluid is air and the particles being detected are PM2.5. The particles may be one or more of inorganic particulates, organic particulates and bio-particulates. Bio-particulates include pollen, bacteria and viruses, with pollen being a particular concern.

The apparatus of the invention may be used in a continuous or batch-wise mode. In a continuous mode, the apparatus has a continuous supply of fluid. The fluid enters at the inlet 11 and flows along the fluid-flow passageway 14 to the outlet. When the force 34 is applied, some or all of the particles will be removed from the fluid and will enter the recirculation passageway 36 and hence the recirculation loop 32 where they will be detected. In a batch-wise mode, a sample of fluid enters the apparatus via the inlet 11 and the inlet 11 and outlet 12 are then sealed so that the particles in the sampled fluid can be measured.

Figure 3:
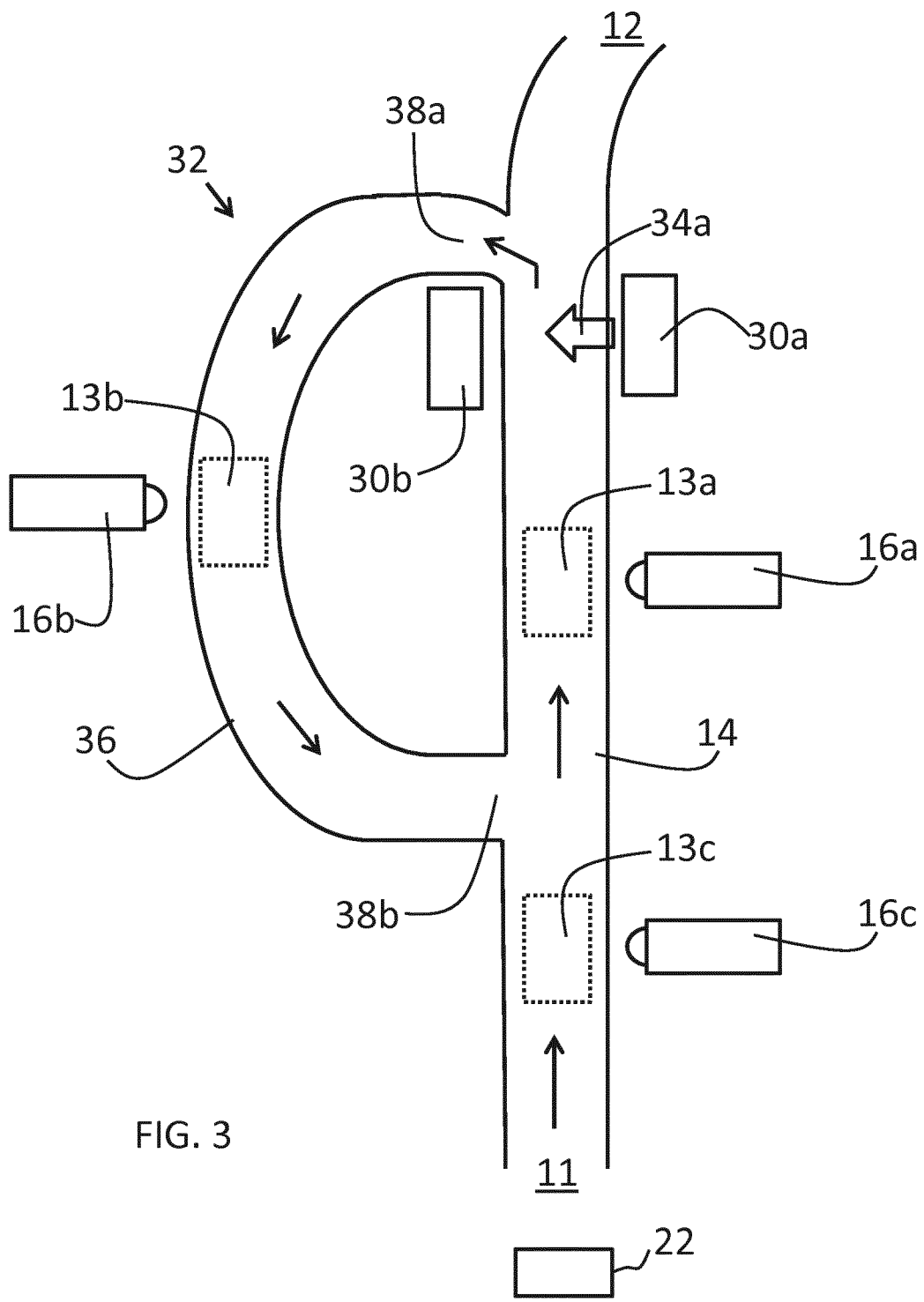
FIG. 3 shows a development of the apparatus of FIG. 2 having three particle sensors.

FIG. 3 shows another embodiment of the apparatus of the invention. The same reference numbers are used as in FIGS. 1 and 2 for the same components, and a description is not repeated.

The apparatus has the fluid-flow passageway 14. In contrast to FIG. 2, the apparatus of the invention employs a first and second force applicator 30a, 30b. The force applied is shown as 34a, as applied by first force applicator 30a. An opposite force (not shown) may also be applied by the second force applicator 30b.

As previously discussed, the force 34a diverts the particles into the recirculation passageway 36. However, if the force is applied in the opposite direction by the second force applicator 30b, a portion of the particles, which would otherwise have entered the recirculation passageway 36 even without any force 34a are diverted to the outlet 12.

Directing a portion of the particles to the outlet 12 provides an effective reduction in the concentration both in the main branch (because the recirculation is reduced) and in the recirculation path itself, and this can be used to extend the detection range when the incoming fluid contains higher levels of particles.

Thus, the concentration which is present without any force application may be increased or decreased as desired.

A second particle sensor 16b is shown in the recirculation path. It detects a lower concentration than the first particle sensor 16a. This is advantageous in the situation where the first particle sensor 16a is overwhelmed by the high concentration of particles. By diverting more particles to the exhaust, the detection range of the apparatus can be extended. Hence, it is able to handle both high and low concentrations of particles.

The invention therefore provides a method for determining particle concentration in a fluid comprising the following steps. In step (i), the fluid is provided to the inlet of the apparatus as set out in FIG. 3. In step (ii), a force is applied to recirculate a first portion of the particles through the recirculation loop and a second portion of the particles to the outlet to provide a lower number of particles passing the second particle sensor than in the fluid entering the apparatus. In step (iii), the particles at the second particle sensor are measured. And in step (iv), the concentration of the particles in the fluid is determined based on the concentration of the particles at the second particle sensor.

The ratio of the first portion of the particles being directed through the recirculation loop to the second portion of the particles directed to the outlet will depend on the initial concentration of the particles in the fluid. For higher concentrations, the ratio will need to be lower, i.e. more particles will be directed to the outlet. An analysis can only be performed where at least a portion of the particles is directed into the recirculation passageway. Example of the ratio of the first portion to the second portion are 5-95%, 10-80% and 20-50%.

An optional third, inlet, particle sensor 16c may also be included, as shown in FIG. 3. The third particle sensor 16c provides an initial assessment of the concentration of the particles entering the apparatus. It can therefore detect particles prior to entry into the recirculation loop. It can distinguish between low and high concentrations. The processor can be configured to determine whether a given concentration is low or high. This will depend on the nature of the fluid, the particles, the flow rate, the types of sensors used and the timeframe required for the measurement. All of these parameters are well known in the art.

Examples of cut-off values between low and high concentrations are low being less than 100 $\mu g/m^3$, preferably less than 50 $\mu g/m^3$ and most preferably less than 20 $\mu g/m^3$, and hence for a binary determination high will be defined as 100 $\mu g/m^3$ or more, preferably 50 $\mu g/m^3$ or more and most preferably 20 $\mu g/m^3$ or more, respectively.

There may be more than two control settings, so that the initial concentration may be determined as low, medium or high for example. Thus, there may be two or more thresholds.

The cut off values depend on the sensor itself. By way of example, below 25 $\mu g/m^3$ may be defined as low. If saturation happens at 500 $\mu g/m^3$, a high value could be defined as 400 $\mu g/m^3$, after which it is better to reduce the concentration to avoid sensor saturation if there is a spike in pollution. Thus, the high concentration may be selected in dependence on the sensor saturation level.

The assessment of high and low concentrations is pre-determined by the operator/manufacturer depending on the technical application.

The assessment of low or high determines the direction of the force applied.

If the particles are deemed to be in low concentration, a force 34a is applied to recirculate some or all of the particles through the recirculation loop to provide a higher number of particles passing the first 16a (and when present, second 16b) particle sensors than in the fluid entering the apparatus. If the particles are deemed to be in high concentration, a force is applied to recirculate a first portion of the particles through the recirculation loop and a second portion of the particles to the outlet to provide a lower number of particles passing the second particle sensor than in the fluid entering the apparatus. The first and second force applicators 30a, 30b therefore provide a bidirectionality to the apparatus, in that particles can be directed to the recirculation passageway 36 or the outlet 12.

The method is therefore as follows. In step (i), the fluid is provided to the inlet of the apparatus. In step (ii), the particles at the third particle sensor are measured and an assessment is made as to whether the particles are at a pre-determined low concentration (which requires a higher detection limit) or at a pre-determined high concentration (which requires a higher detection range). In step (iii), if the particles are in low concentration, the force is applied to recirculate some or all of the particles through the recirculation loop to provide a higher number of particles passing the first particle sensor than in the fluid entering the apparatus, and if the particles are in high concentration, the force is applied to recirculate a first portion of the particles through the recirculation loop and a second portion of the particles to the outlet to provide a lower number of particles passing the second particle sensor than in the fluid entering the apparatus. In step (iv) the concentration of the particles in the fluid is determined based on the concentration of the particles at the second particle sensor.

Again, the whole process is under the control of the processor (not shown in FIG. 3).

It should be apparent from the description of FIGS. 2 and 3 that FIG. 2 describes a simpler version of apparatus having just one sensor 16. When only a first sensor is present, it can be located at any point in the recirculation loop 32. When a first and second sensor 16a, 16b are used, the first sensor 16a is located in the fluid-flow passageway 14 and the second sensor 16*b* is located in the recirculation passageway 36. This allow for the sensors to detect different concentrations of particles based on a selective exhausting of some of the particles under the application of force from force applicator 30*b*. In a preferred embodiment, an initial measurement is taken by the third sensor 16*c*.

The key is to apply a force in the required direction, either to push the particles into the recirculation loop so that the sensor senses the same particles multiple times thereby effectively concentrating the particles, or pushing some of the particles to the exhaust so that the sensors are no overwhelmed and the range is extended.

The application of force to particles in a fluid is a well-known technology. The force applicator may apply force in the form of heat, electromagnetic radiation, electrical energy or sound. Any of these energy source can be used to cause migration of the particles relative to the fluid ("-phoresis") to the particles.

The techniques therefore employ thermophoresis, photophoresis, application of acoustic radiation, or dielectrophoresis. Thermophoresis is preferred.

The invention preferably uses thermophoresis, although other techniques may also be used. A thermophoretic force is a phenomenon observed in mixtures of mobile particles where the particles respond to the force of a temperature gradient. Thermophoresis is applicable to particle detection for particulates, such as pollutants and pollen. The heated particles create a fast flow away from the heat source down the temperature gradient, based on the kinetic energy which has been acquired by the particles. The invention may for example make use of so-called positive thermophoresis, by which the particles of interest move from the hot to cold region. Lighter or smaller species in the fluid may exhibit negative behavior to fill the void vacated by the particles of interest. In this way, the overall flow cross section is not changed, and hence the overall flow rate remains the same, but the particles are diverted. In this way, the particles are directed into the recirculation loop or to the outlet.

The use of thermophoresis to divert the particles is particularly advantageous because the heating, for creating the required temperature gradient, is easily controlled and has a low cost of implementation.

The heating arrangement may be adjustable to provide different levels of thermophoretic force on the particles.

An adjustable heating arrangement allows the force to be varied, and therefore the extent of the increased concentration of the particles at the detection volume to be varied. The level of heat can be varied in use.

The heating arrangement may comprise a plurality of independently controllable heating elements. The use of multiple independently controllable heating arrangements provides a simple way to provide adjustment of the heating arrangement.

Photophoresis may also be used. Small particles suspended in a fluid start to migrate when illuminated by a sufficiently intense beam of light. The existence of this phenomenon is based on a non-uniform distribution of temperature of an illuminated particle in a fluid medium.

The particles migrate when they have a refractive index different from their surrounding medium. A particle with a higher refractive index compared to its surroundings moves away from the light source owing to momentum transfer from the absorbed and scattered light photons. This is referred to as a radiation pressure force. This force depends on light intensity and particle size, although not the surrounding medium.

The power density is typically around 10 kW/m$^2$. The radiation source is typically a laser, e.g. a VCSEL laser. A suitable laser uses near IR light. The required power densities may be readily achieved using a 1 W laser with an active area of 1 mm$^2$. The required light intensity can also be achieved using a halogen incandescent lamp.

Another application of electromagnetic radiation is to use so-called "optical tweezers". This technique uses a highly focused laser beam to provide an attractive or repulsive force (typically on the order of piconewtons), depending on the refractive index mismatch to physically hold and move microscopic dielectric objects. The laser powers needed to trap biological particles is less than 1 W.

A related technique is the use of "acoustic tweezers". This technique controls the movement of particles using sound waves. In a standing acoustic field, particles will experience an acoustic radiation force that moves the particles to special regions of the acoustic field. The force is proportional to the volume of the particle. And depending on the properties (density, compressibility) of the particles, they can be moved to either acoustic pressure nodes (minimum pressure regions) or pressure antinodes (maximum pressure regions). As a result, precise manipulation of particles using sound waves is feasible by controlling the position of pressure nodes. Acoustic tweezers do not require expensive equipment and complex experimental setups.

The acoustic powers needed are orders of magnitude lower than those in optical tweezers.

Dielectrophoresis (or DEP) may also be used. DEP a phenomenon in which a force is exerted on a dielectric particle when it is subjected to a non-uniform electric field. This force does not require the particle to be charged. All particles exhibit dielectrophoretic activity in the presence of electric fields. However, the strength of the force depends strongly on the electrical properties, shape and size of the particles, as well as on the medium and the frequency of the electric field.

For micron-sized particles, electric fields in the order of 100 V/m are needed. With a typical electrode separation of 0.5 cm, this would correspond to an applied voltage of 50 V. In each of these techniques, the power source is adjustable to provide different levels of force to the particles.

In order to allow the particles to move smoothly in the loop, certain kinds of smooth and low surface energy material or surface coating (such as Teflon polymer) may be applied to the inner wall.

Figure 4:
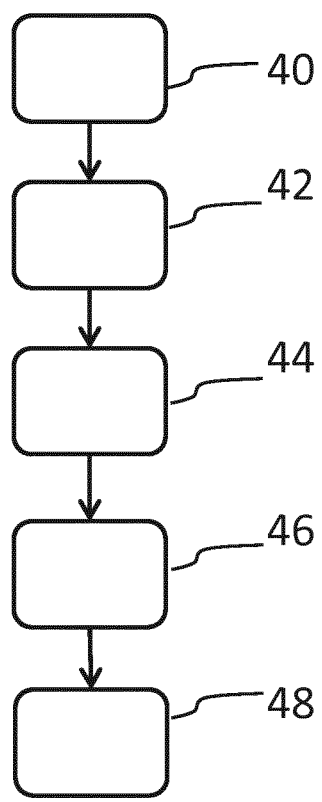
FIG. 4 shows a particle sensing method.

FIG. 4 shows a method for determining particle concentration in a fluid. comprising:

step 40 of detecting a concentration of particles at the inlet to the apparatus and assessing if the particles have relatively low concentration or relatively high concentration;

step 42 of providing the fluid to the inlet 11 of the fluid-flow passageway 14;

step 44 of applying a force 34, 34*a* to the particles entrained in the fluid to control the passage of the particles either into the recirculation passageway 36 or to the outlet 12;

step 46 of detecting a concentration of particles within the recirculation loop; and step 48 of determining the concentration of particles in the fluid based on the concentration of particles detected within the recirculation loop 32.

If the particles are detected in step 40 to have a relatively low concentration then the force applied in step 44 directs them towards the recirculation passageway, and the concentration of particles is detected within the fluid-flow passageway to increase the detected concentration.

If the particles are detected in step 40 to have a relatively low concentration then the force applied in step 44 directs them towards the outlet, and the concentration of particles is detected within the recirculation passageway to reduce the detected concentration.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A particle sensing apparatus for determining particle concentration in a fluid comprising:
    a fluid-flow passageway having an upstream inlet to receive the fluid and a downstream outlet to exhaust the fluid;
    a recirculation passageway in fluid communication with the fluid-flow passageway, where a portion of the fluid-flow passageway and the recirculation passageway define a recirculation loop;
    a flow control arrangement for generating a flow of said fluid between the upstream inlet and the downstream outlet and around the recirculation loop;
    a first particle sensor located in the recirculation loop;
    a force applicator to apply a force to the particles entrained in the fluid such that the particles move relative to said flow, the force applicator being arranged to control the passage of the particles either into the recirculation loop or to the downstream outlet;
    an inlet particle sensor for detecting an inlet concentration of particles in the fluid, said inlet particle sensor being located in the fluid-flow passageway between the upstream inlet and said portion of the fluid flow passageway; and
    a processor adapted to:
        determine the concentration of particles in the fluid based on the concentration of particles detected at the first particle sensor,
        compare said inlet concentration to a predetermined upper concentration threshold and a predetermined lower concentration threshold, and
        control the force applicator to direct the particles towards the recirculation passageway if said inlet concentration is lower than or equal to the lower concentration threshold, or towards the outlet if said inlet concentration is higher than or equal to the upper concentration threshold.

2. The apparatus as claimed in claim 1, wherein the force applicator is:
    for applying a force to the particles to direct them towards the recirculation loop; or
    for applying a force to the particles to direct them towards the downstream outlet.

3. The apparatus as claimed in claim 1, wherein the force applicator comprises a first force application unit for applying a force to the particles to direct them towards the recirculation loop and a second force application unit for applying a force to the particles to direct them towards the downstream outlet.

4. The apparatus as claimed in claim 1, wherein the force applicator applies heat, electromagnetic radiation, electrical energy or sound.

5. The apparatus as claimed in claim 1, wherein the force applicator is adjustable to provide different levels of force to the particles.

6. The apparatus as claimed in claim 1, wherein the first particle sensor is located in said portion of the fluid-flow passageway, and the apparatus further comprises a second particle sensor located in the recirculation passageway.

7. The apparatus as claimed in claim 1, wherein the fluid is air.

8. The apparatus as claimed in claim 1, wherein the first particle sensor comprises an optical module for emitting light and a detector for detecting light scattered by the entrained particles.

9. The apparatus as claimed in claim 8, further comprising a second particle sensor and an inlet particle sensor, wherein:
    the first particle sensor is located in said portion of the fluid-flow passageway,
    the second particle sensor is located in the recirculation passageway,
    the inlet particle sensor is located in the fluid-flow passageway between the upstream inlet and said portion of the fluid flow passageway,
    the first particle sensor, the second particle sensor, and the inlet particle sensor comprise an optical module for emitting light and a detector for detecting light scattered by the entrained particles.

10. A method for determining particle concentration in a fluid comprising the steps of:
    providing the fluid to an inlet of a fluid-flow passageway;
    detecting an inlet concentration of particles at the inlet;
    generating a flow of said fluid between the inlet and an outlet of the fluid-flow passageway and around a recirculation loop which is defined by a portion of the fluid-flow passageway and a recirculation passageway;
    comparing said inlet concentration to a predetermined upper concentration threshold and a predetermined lower concentration threshold;
    applying a force to the particles entrained in the fluid such that the particles move relative to said flow, said force directing the particles towards the recirculation passageway if said inlet concentration is lower than or equal to the lower concentration threshold, or towards the outlet if said inlet concentration is higher than or equal to the upper concentration threshold;
    detecting a concentration of particles within the recirculation loop; and
    determining the concentration of particles in the fluid based on the concentration of particles detected within the recirculation loop.

11. The method as claimed in claim 10, wherein applying a force comprises applying a force to the particles to direct them towards the recirculation passageway, and detecting a concentration of particles is within the fluid-flow passageway, such that applying a force provides a higher detected concentration than in the fluid entering the inlet of the fluid-flow passageway.

12. The method as claimed in claim 10, wherein applying a force comprises applying a force to the particles to direct them towards the outlet, and detecting a concentration of particles is within the recirculation passageway of the recirculation loop, such that applying a force provides a lower detected concentration than in the fluid entering the inlet of the fluid-flow passageway.

13. The method as claimed in claim 10, further comprising:
- if the inlet concentration is equal to or lower than said predetermined lower concentration threshold, detecting a concentration of particles within the fluid-flow passageway, such that applying a force provides a higher detected concentration than in the fluid entering the inlet of the fluid-flow passageway;
- if the inlet concentration is equal to or higher than said predetermined upper concentration threshold, detecting a concentration of particles is within the recirculation passageway of the recirculation loop, such that applying a force provides a lower detected concentration than in the fluid entering the inlet of the fluid-flow passageway.

14. The method as claimed in claim 13, wherein the predetermined lower concentration threshold is between 20 $\mu g/m^3$ and 100 $\mu g/m^3$.

\* \* \* \* \*